United States Patent [19]

Gerstmann et al.

[11] E Patent Number: Re. 33,082

[45] Reissued Date of Patent: Oct. 10, 1989

[54] COMBUSTION PRODUCT CONDENSING WATER HEATER

[75] Inventors: Joseph Gerstmann, Framingham; Andrew D. Vasilakis, Bedford, both of Mass.

[73] Assignee: Advanced Mechanical Technology, Inc., Newton, Mass.

[21] Appl. No.: 775,661

[22] Filed: Sep. 13, 1985

Related U.S. Patent Documents

Reissue of:

[64] Patent No.: 4,403,572
Issued: Sep. 13, 1983
Appl. No.: 150,289
Filed: May 16, 1980

[51] Int. Cl.[4] ..... F22B 33/00

[52] U.S. Cl. ..... 122/20 B; 165/125; 122/33

[58] Field of Search ..... 122/20 B, 17, 32, 33; 237/8 R, 56, 19; 165/125, 401, 909; 126/427

[56] References Cited

U.S. PATENT DOCUMENTS

| | | | |
|---|---|---|---|
| 2,327,339 | 8/1943 | Chandler . | |
| 2,937,625 | 5/1960 | Meyers . | |
| 3,896,992 | 7/1975 | Borovina et al. . | |
| 4,090,474 | 5/1978 | Kauffmann | 122/20 B |
| 4,136,731 | 1/1979 | DeBoer | 122/20 B X |
| 4,163,430 | 8/1979 | Neumann . | |
| 4,222,350 | 9/1980 | Pompei et al. . | |
| 4,227,647 | 10/1980 | Eriksson . | |
| 4,253,446 | 3/1981 | Müller . | |
| 4,366,778 | 1/1983 | Charrier et al. . | |
| 4,401,058 | 8/1983 | Charrier et al. . | |

FOREIGN PATENT DOCUMENTS

| | | |
|---|---|---|
| 30162 | 1/1885 | Fed. Rep. of Germany . |
| 1907987 | 9/1970 | Fed. Rep. of Germany . |
| 3041265 | 9/1982 | Fed. Rep. of Germany . |

OTHER PUBLICATIONS

Smay, V., High Efficiency Home Heating, Popular Science, Nov. 1979, pp. 60, 62, 158, 162, 164.
Boston Gas Products, "Heat Maker Brochure", 1980.
Hydro Therm, "Hydro Pulse Brochure", A1-379.
Water Supply Boiler/Heaters and Package Systems, Raypak, Catalog No. 3000-d, pp. 2-7, 8/1/78.
The Laars Type AF Heavy Duty Commercial Pool Heater, Laars Engineers, Catalog 3.1.001-4, 6/1/70.

*Primary Examiner*—Henry A. Bennett
*Attorney, Agent, or Firm*—Hamilton, Brook, Smith & Reynolds

[57] ABSTRACT

In a water heating system, vapor in the products of combustion gases is condensed in a secondary heat exchanger positioned in a housing with the primary heat exchanger and combustion chamber. The two heat exchangers are coaxial coils with the secondary coil positioned below the primary. Gases flow radially through the primary coil and then axially through the secondary coil at an increased velocity. The gases are then used to pre-heat a gas/air mixture in a third heat exchanger within the secondary heat exchanger. The pre-heated gas/air mixture is burned in a burner within the primary heat exchanger and the gas products are drawn through the exchangers by a blower. A water storage tank is designed to enhance stratification of hot water over cooler water. The cooler water is used to condense vapor in the secondary heat exchanger.

50 Claims, 4 Drawing Sheets

COMBUSTION PRODUCT CONDENSING WATER HEATER

Matter enclosed in heavy brackets [ ] appears in the original patent but forms no part of this reissue specification; matter printed in italics indicates the additions made by reissue.

FIELD OF THE INVENTION

This invention relates to water heaters. More particularly, it relates to water heaters in which vapor in the products of combustion is condensed to retrieve latent heat of vaporization.

BACKGROUND

With the increasing cost of fuel, methods for increasing the efficiency of heat exchanger assemblies for extracting heat from the products of combustion of fuel burners has become increasingly more cost effective. One means of increasing the efficiency of heat recovery has been to burn the fuel in small-volume, water-walled combustion chambers. Forced draft or pulsed combustion techniques are utilized to achieve high rates of heat transfer and to vent the products of combustion.

Recently, systems have been proposed to cool the products of combustion below the dew point temperature of those products, typically below 130° F., in order to condense some of the vapor and thereby extract the latent heat of vaporization of that vapor. To cool the products of combustion to that extent and to minimize the size, and thus the cost, of the heat exchanger assemblies, efficient heat exchangers must be designed.

An object of this invention is to provide an efficient water heating system in which heat is extracted from the products of combustion by condensing vapor in the products, the system having an acceptable size and cost.

The condensate from natural gas combustion products is mildly acidic, and the acidic nature of the condensate is expected to be a potential cause of corrosion. The acidic nature of the condensate may result from sulfuric acid, nitric acid, and carbon acid.

A further object of this invention is to provide a water heating system designed to withstand the corrosive effects of the condensate at a minimal cost.

DISCLOSURE OF THE INVENTION

In a heating assembly of this invention, primary and secondary heat exchangers and a combustion chamber are positioned within a single housing. The combustion chamber is defined by the primary heat exchanger. The combustion products flow through the primary heat exchanger at a sufficiently low velocity to keep the temperature of the heat exchanger walls at an acceptable level. The products of combustion are then directed into a secondary heat exchanger in which the velocity of the products of combustion is increased in order to increase the heat transfer coefficient of that heat exchanger. Cold water flows through the secondary heat exchanger in counter flow relationship with the combustion gases to cool those products to a temperature below the dew point temperature. Vapor in the products of combustion is thereby condensed. After being heated in the secondary heat exchanger, the water is mixed with hot water from the output of the primary heat exchanger and the water mixture is directed through the primary heat exchanger at a higher flow rate than in the secondary heat exchanger. The hot mixture of water entering the primary heat exchanger assures that no condensation of the products of combustion occurs at this heat exchanger.

In the preferred water heating assembly, the primary heat exchanger is a coil of tubing which defines the combustion chamber. Products of combustion flow radially through that coil. The secondary heat exchanger is a second coil of tubing coaxial with but lower than the first. Products of combustion flow through that coil axially at a higher velocity. Prior to combustion, the combustion air and fuel may be preheated by combustion products in a tertiary heat exchanger which receives those products from the secondary heat exchanger.

In a system in which hot water is stored in an insulated storage tank, cool water is taken from the bottom of the tank and introduced into the burner and heat exchanger assembly, and the heated water is returned to an upper section of the storage vessel in such a manner as to avoid of the heated water with the cooler water in the bottom of the vessel.

The preferred system utilizes a blower downstream of the burner and heat exchanger assembly for inducing a draft to propel the products of combustion.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
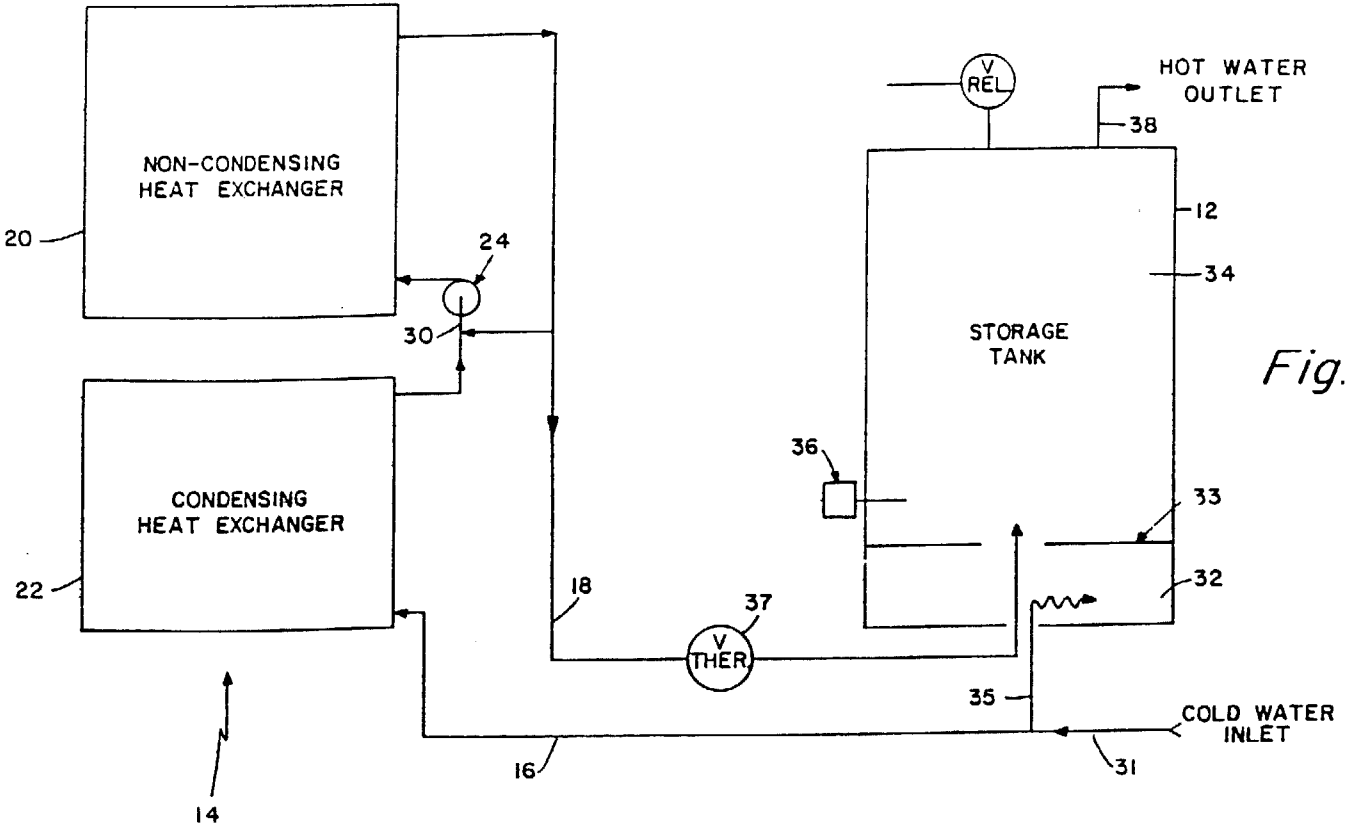
FIG. 1 is a block diagram of the water circuit of a preferred system embodying this invention.

A preferred system embodying this invention is shown schematically in FIG. 1. A storage tank 12 is connected to an external gas-fired water heater 14 by supply and return pipes 16 and 18. The water heater 14 comprises a primary, fired heat exchanger assembly 20 and a economizer 22 which is a secondary heat exchanger operating in the condensing mode. A circulating pump 24 placed between the economizer and the primary heat exchanger draws water from the return line 18 and from the economizer 22 and drives that mixture through the primary heat exchanger 20.

The storage tank is designed to maximize stratification between a small volume 32 of relatively cool water in the bottom of the tank and a larger volume 34 of stored hot water. In this case, the two volumes are separated by baffles 33. Typically the cool volume 32 is about 20 percent of the total tank volume. If hot water is taken from the outlet 38 of the storage tank while the heater 14 is in the standby mode, cold water is introduced into the lower volume 32 through a diffuser from a cold water inlet 31 and pipe 35.

When the heater assembly 14 is turned on, water is drawn from the lower volume 32 through pipe 16 if no water is being extracted through outlet 38; or a mix of water from the cold water inlet 31 and the lower volume 32 is drawn through pipe 16 if water is being extracted from the outlet 38. Water heated in the heater assembly 14 is returned through pipe 18 to the upper volume 34 in the storage tank 12. The baffles 33 inhibit mixing of the hot water from pipe 18 with the cooler water in the volume 32.

The cool water introduced into the economizer 22 through pipe 16 passes in counter flow heat exchange relationship with products of combustion which have already been cooled somewhat in the primary heat exchanger 20. The products of combustion and the water are sufficiently cool when introduced into the economizer 22 that the temperature of the products of combustion within the economizer is below the dew point temperature. This results in condensation of vapor in the products of combustion, and the latent heat of vaporization is transferred to the water in the economizer.

Water which has been preheated in the economizer 22 is introduced into the primary heat exchanger 20 which defines a combustion chamber. There the water is heated to the high temperature necessary for heating the water in the storage tank 12.

The purpose of the cold volume 32 should now be apparent. It provides a sufficiently large reservoir of cool water to enable the economizer to operate in the condensing mode throughout the on-cycle even when no cold water is drawn through the inlet 31 during the heating cycle. The volume of cool water should be minimized to reduce standby losses from and to limit the size of the storage. To that end, the cool water is rationed to the heater 14 at a low flow rate to condense vapor in the exhaust gas with a minimal amount of water.

The percentage of the storage tank which must be devoted to the volume of cooler water 32 can be determined from the following equation:

$$\frac{V_H}{V_C} = \frac{T_R - T_{cut\text{-}in}}{T_{Diff}}$$

Where $V_H$ and $V_C$ are the respective hot and cool volumes 34 and 32, $T_R$ is the temperature of the water in return line 18, $T_{cut\text{-}in}$ is the temperature of water in the storage tank at which the water heater is fired, and $T_{Diff}$ is the differential between the thermostat cut-in and cut-off temperatures. Typically, $T_R - T_{cut\text{-}in}$ is in the range of 40° to 50° F. To minimize standby losses and total tank volume, the volume $V_C$ should be less than 20 percent of the total tank volume. Thus, the thermostat differential temperature must be less than about 10° F. A temperature differential of 5° to 10° F. and a cool volume of 10 to 20 percent of the total tank volume are reasonable. For a given burner input, the flow rate through the heater can be controlled by a thermostatic valve 37 to maintain the desired return temperature. Alternatively, the flow rate might be held constant and the burner input [vaired] *varied* to maintain the steady return temperature.

Placement of pump 24 between primary heat exchanger 20 and the secondary heat exchanger 22 is important for the following reason. Hot water from the outlet 28 of the primary heat exchanger is recirculated back to the inlet 30 to raise the water inlet temperature of that heat exchanger above the dew point temperature of the products of combustion. This is done to prevent condensation in the primary heat exchanger. To minimize the cost of the system, the primary heat exchanger is not protected against corrosion by flue gas condensate.

A further advantage of recirculating water through the primary exchanger is that it increases water flow rate and thus establishes high water-side heat transfer coefficients. This minimizes liming of the main heat exchanger coil. This is unnecessary in the economizer due to the significantly low heat fluxes and water temperatures in the economizer section.

The operating principle is best illustrated by the following example: Consider a 100 gallon tank with a thermostat that operates over a 10° F. differential and is located one fifth of the way from the bottom of the tank. Assume that the lower section 32 of the tank contains 20 gallons of water at an average temperature of 80° F, and that the average storage temperature is 140° F.

In the proposed concept, the water heater would use the 20 gallons of cooler water to heat 80 gallons of stored water from 135° F. to 145° F. During this process, the cooler water would be displaced by 135° F. water. A heat balance indicates that the total energy required is 15,700 Btu. If the heat output of the water heater is 157,000 Btu/hr, then the burner-on time is 6 minutes. In this case, the circulating pump 24 would draw water at the rate of 3.33 GPM from the bottom section and would return it to the top section at a temperature of 175° F. At the end of the on-cycle, the mixed temperature of the upper section will have reached 145° F., and the bottom section will contain water at 135° F. The flow control is preferably accomplished by thermostatic control of the return temperature to the tank by a valve 37 [at] *as* this will prevent excessive temperatures if the bottom temperature, and thus the heater inlet temperature, gets too high. Alternatively, the desired flow rate may be set by a constant flow regulator or by a fixed orifice.

A variation of the concept might include the use of a separate, smaller preheat tank instead of the integral volume 32.

Figure 2:
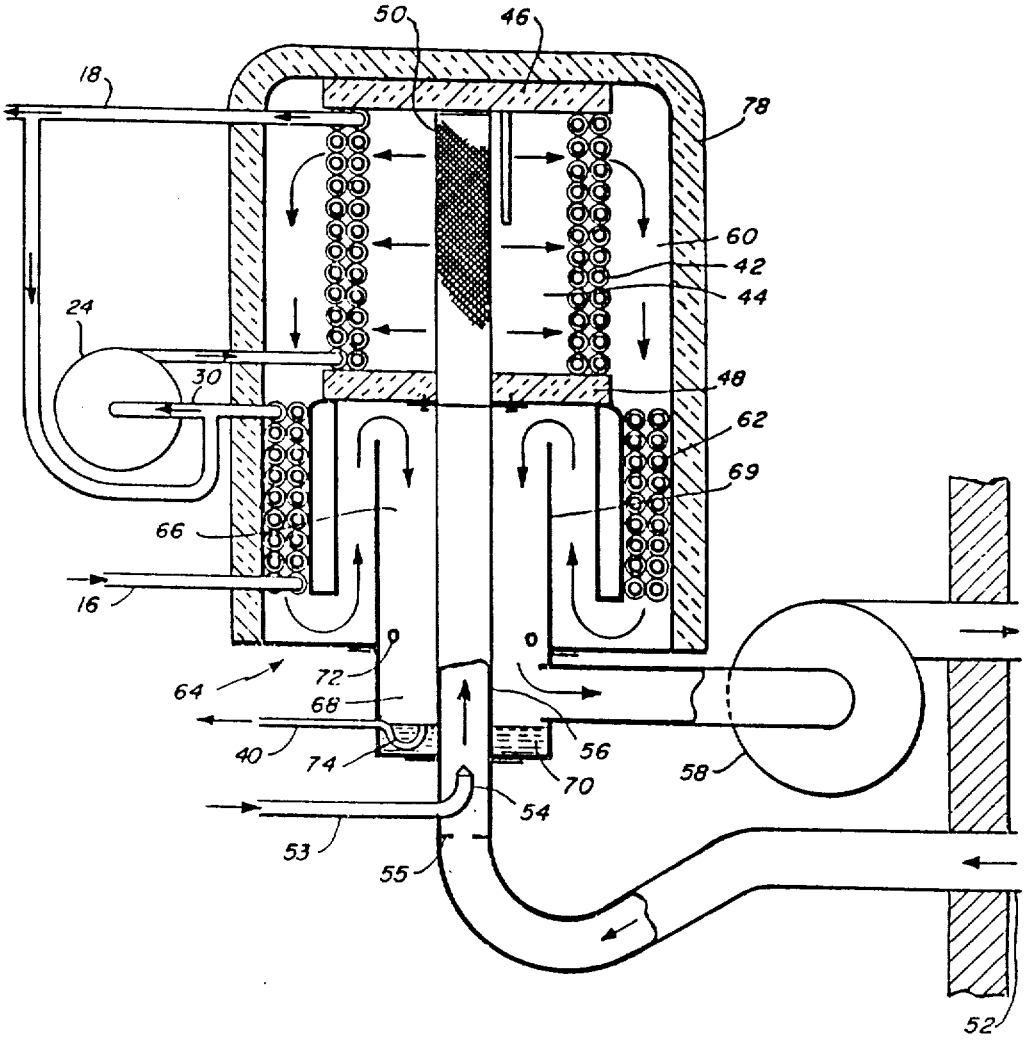
FIG. 2 is an elevational cross sectional view of a preferred embodiment of the burner and heat exchanger assembly embodying this invention.

A preferred design of the water heater 14 is shown in FIG. 2. The primary heat exchanger consists of an integrally finned copper tube coil 42 surrounding the combustion chamber 44. This arrangement provides an efficient "water-wall" combustion chamber, which minimizes combustion chamber heat losses and requires a minimal amount of refractory insulation 46 and 48. Moreover, with radial flow through the coil, the large area of the coil facing the combustion chamber provides relatively low gas velocities. Such low gas velocities are necessary to prevent excessive wall temperatures due to the high temperature of the combustion products.

A mixture of natural gas and air is burned at a burner 50 within the combustion chamber. In a pipe 56 combustion air from an exterior inlet 52 is mixed with natural gas from a pipe 53 and nozzle 54. The desired air flow rate is established by fixed orifice 55. The mixture is drawn into the combustion chamber by a blower 58 positioned in the flue gas outlet. Alternatively, the mixture can be propelled by a blower placed upstream of the burner.

Combustion gases are collected in an exhaust annulus 60 before passing through the economizer coil. The gas temperature at the annulus is in the range of 250° to 400° F.

The combustion products are cooled further in the economizer coil 62 which is designed for condensing operation. Because of the corrosive properties of the condensate, the economizer is made of a corrosion-resistant material, such as 70/30 cupronickel. The economizer is designed for cross-counterflow of the combustion products. With axial flow of gasses through this coil, the combustion products flow at high velocities in order to achieve high heat transfer coefficients. Here, high gas-side transfer coefficients can be utilized without fear of excessive wall temperatures because both the gas and water temperature are much lower than in the main heat exchanger. Most of the system product of combustion pressure drop will occur in this section.

FIG. 2 also illustrates a third heat exchanger section 64. This is a counterflow pre-heater which uses the latent and sensible heat of the exhaust products to preheat the incoming gas/air mixture. The preheater 64 is a compact arrangement positioned concentrically within the economizer coil 62. Exhaust gas which has passed through the economizer is directed up through a first annulus 66 and then back down through a second annulus 68. The annuli are separated by a cylinder 69 Gas in the annulus 68 is in counter flow heat exchange relationship with the incoming mixture of natural gas and air. Any liquid which condenses from the exhaust gases in the preheater is collected in a reservoir 70. Also, any condensed liquid from the economizer 62 flows through holes 72 in the cylinder 69 into that same reservoir. The collected liquid is taken off through an anit-syphon tube 74 to the drain pipe 40. The anti-syphon tube insures that exhaust gas can not leak into the surrounding area but allows condensate to be drained from the heater.

With sufficiently low incoming water temperatures, the preheater 64 is probably unnecessary, since it will add less than 1% to the recovery efficiency. However, when incoming water temperatures are high, as may occur in a hot water booster, the air preheater may product worthwhile savings. The heat that can be recovered in this type of preheater is limited by the heat capacity of the incoming mixture. Typically, preheating the inlet mixture by 100° F. would increase efficiency by approximately 2.5%.

Losses in the system are minimized through the use of several design features. The combustion chamber is small and does not have a large inactive surface exposed to flame temperatures. The first stage heat exchanger is small with little water inventory. The bottom surface of the combustion chamber forms the top of the air preheater, so that heat losses in this direction will reenter the exhaust stream and increase the heat recovered in the preheater. Insulation is shown on this surface only for the protection of the metal surface which forms the bottom of the combustion chamber. This insulation may be eliminated if the exhaust gas can be utilized to cool this surface. The main "radiation" heat loss occurs through the top of the combustion chamber and along the outside shroud which contain the exhaust gas. Both these surfaces are insulated with insulation 78 to minimize these losses. The exhaust gas is relatively cool by the time it reaches the bottom of the unit and this surface need not be insulated.

Other significant features include the use of an induced draft blower which causes the unit to operate under negative craft conditions; thus, sealing the heater is not as critical as it would be if the unit were pressurized. Also since the exhaust gas is cool at this point, a plastic blower may be used to reduce costs and improved performance over a sheet metal blower.

The unit is shown using sealed combustion; that is, combustion air is drawn directly from the building exterior and exhaust gas is blown directly to the exterior. A natural convection stack is not feasible because of the low exhaust temperature. An alternative is the use of a conventional air intake plus exhaust through plastic pipe installed as a roof vent or through an unused chimney.

Figure 3:
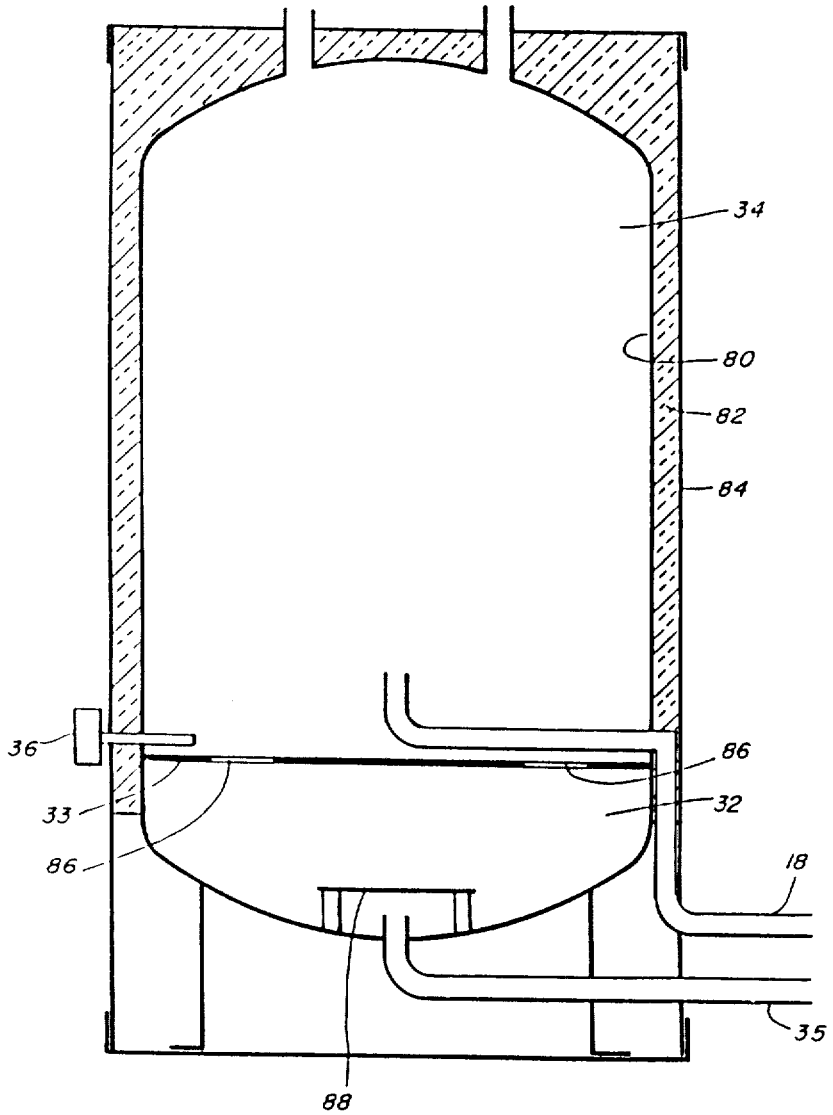
FIG. 3 is an elevational cross sectional view of a possible storage tank configuration for use with this invention.
Figure 4:
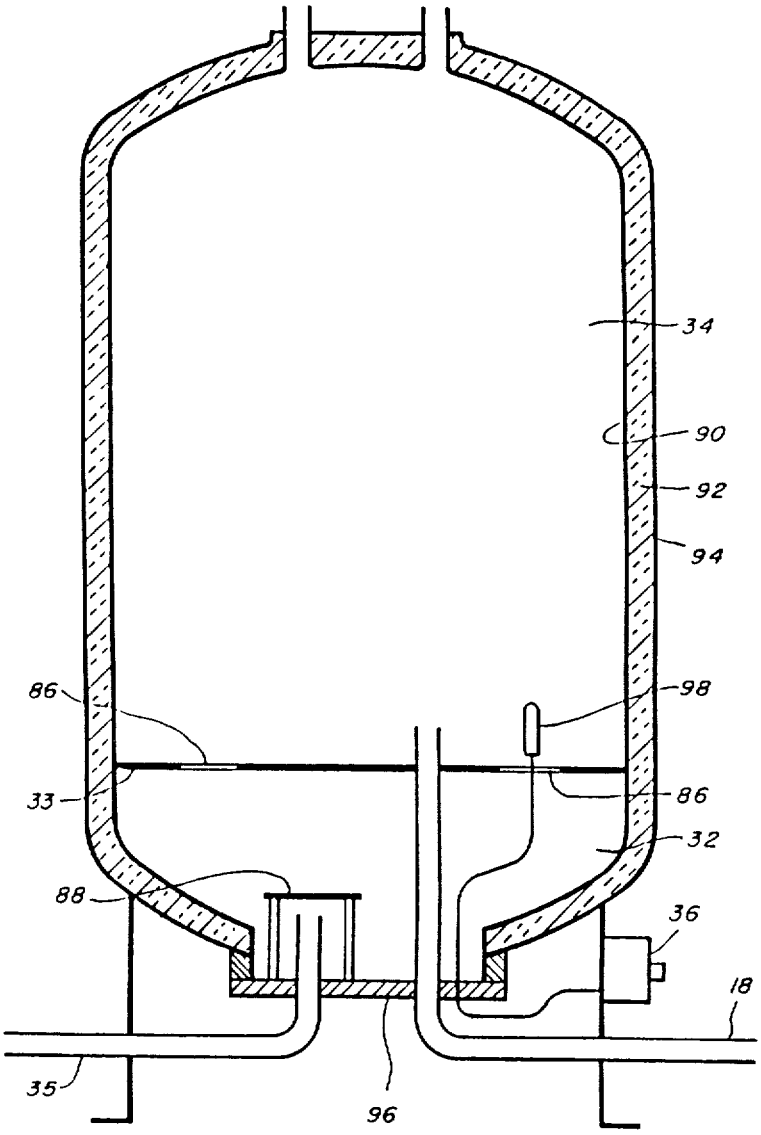
FIG. 4 is an elevational cross sectional view of an insulated plastic lined storage tank for use in this invention.

Alternative storage tanks are illustrated in FIGS. 3 and 4. The tank of FIG. 3 is conventional, with the exception of the provisions for stratification described above. This tank is a glass lined steel tank 80 surrounded by insulation 82 and a metal housing 84. The hot return pipe 18 [eenters] *enters* through the side of the tank and directs the hot water upwardly into the upper volume 34. The baffle 33 is positioned below the hot return pipe 18 to assist in the natural stratification of the hot and cool water within the tank. Holes 86 in the baffle allow for displacement of water through the baffle as necessary. A diffuser 88 is positioned over the inlet pipe 35 so that flow between the volumes 32 and 34 is not induced by introduction of cold water into the tank. A thermostat 36 controls the operation of the heater.

An alternative version of the tank is illustrated in FIG. 4. This preferred tank structure includes a plastic lining 90 surrounded by insulation 92, such as foam insulation, and an outer steel tank 94. All connections to the interior of the tank are through a bottom plate 96. This arrangement includes the baffle 33 and the diffuser 88 as in the embodiment of FIG. 3. The thermostat 36 is also connected through the bottom plate 96 to a remote sensing bulb 98.

It should be noted that the baffle 33 is not absolutely necessary. It may be sufficient to have the hot return pipe outlet positioned sufficiently high within the tank that a lower volume of cool water remains. Also, flow directors may be mounted directly to the outlet of pipe 18 to avoid the need for a baffle 33 fabricated within the storage tank.

While this invention has been particularly shown and described within references to preferred embodiments thereof, it will be understood by those skilled in the art that various changes in form and details may be made therein without departing from the spirit and scope of the invention as defined by the appended claims.

We claim:

1. A method of heating water and storing the hot water in an insulated storage vessel comprising:

permitting natural stratification of the water within the vessel such that cooler water collects at the bottom of the vessel;

withdrawing cooler water from the bottom of the vessel and passing that water in heat exchange relationship with combustion gases from a burner assembly to cool those gases below their dew point temperature so as to extract some of the latent heat of vaporization from the gases and to heat the water;

returning the thus heated water to the storage vessel at a location in the storage vessel above the cooler water and in a manner as to avoid mixing with the cooler water, the volume of the cooler water below the location at which hot water is returned to the vessel being sufficiently large to provide for condensation of the combustion gases through substantially the entire heating cycle of the burner.

2. A water heating system comprising:

a water-walled combustion chamber defined by a primary heat exchanger, the products of combustion gas flow path past the primary heat exchanger providing for a first gas velocity through the primary heat exchanger;

a secondary heat exchanger for receiving gases cooled by the primary heat exchanger, the secondary heat exchanger providing for a second gas velocity substantially greater than the first;

a water storage assembly including a tank having a baffle to separate a volume of hot water from a smaller volume of cooler water at the bottom of the tank in communication with the hot water and a diffuser positioned over a cold water inlet into the bottom of the tank;

means for circulating the cooler water through the secondary heat exchanger in counterflow heat exchange relationship with the combustion gases to cool the gases below their dew point temperature and condense water vapor from the gases; and means for directing the water from the secondary heat exchanger through the primary heat exchanger to cool the combustion gases to a temperature which is above the dew point temperature.

3. A water heating assembly comprising:

a heat exchanger and combustion chamber housing;

a water-walled combustion chamber within the housing surrounded by a primary heat exchanger, the products of combustion gas flow path past the primary heat exchanger providing a first gas velocity through the primary heat exchanger;

a secondary heat exchanger within the housing for receiving gases cooled by the primary heat exchanger providing for a second combustion gas velocity substantially greater than the first;

a cool water inlet;

means for circulating cool water from the cool water inlet through the secondary heat exchanger at a first flow rate in heat exchanger relationship with the combustion gases to cool the gases below their dew point temperature and condense water vapor from gases; and a water flow path from the output of the primary heat exchanger to its input for recirculating water in the primary heat exchanger, said water flow path and the primary heat exchanger forming a primary heat exchanger loop;

means for mixing water from the secondary heat exchanger with a portion of the water from the output of the primary heat exchanger and a pump in said primary heat exchanger loop for pumping the water mixture through the primary heat exchanger at a flow rate greater than first flow rate to cool the combustion gases to a temperature which is above their dew point temperature.

4. A water heating system comprising:

a water-walled combustion chamber surrounded by a primary heat exchanger, the product of combustion gas flow path past the primary heat exchanger providing for a first gas velocity through the primary heat exchanger;

a secondary heat exchanger for receiving gases cooled the primary heat exchanger, the secondary heat exchanger providing for a second gas velocity substantially greater than the first;

water storage assembly including a volume of hot water and a smaller volume of cooler water in communication with the hot water;

means for circulating the cooler water from said smaller volume of cooler water through the secondary heat exchanger in heat exchange relationship with the combustion gases to cool the gases below their dew point temperature and condense water vapor from the gases;

means for directing the water from the secondary heat exchanger through the primary heat exchanger to cool the combustion gases to a temperature which is above the dew point temperature; and means for directing heated water from the primary heat exchanger to said volume of hot water in such a manner as to avoid mixing with the smaller volume of cooler water.

5. In a liquid heater comprising an insulated storage vessel and a fuel-fired heat exchanger assembly in which liquid is circulated from the storage vessel to the heat exchanger assembly to be heated, and then returned to the storage vessel, the liquid heater characterized in that:

the heat exchanger assembly comprises a primary heat exchanger consisting of cylindrical finned tubing coils surrounding a central burner, the flow of combustion products from said burner being essentially radially outward through the surrounding coil at a first velocity, the partially cooled combustion products being directed to flow in an axial direction at a second velocity substantially greater than the first over a secondary heat exchanger coil in which said gases are cooled below their dew point temperature so as to extract some of the latent heat in said flue gases;

liquid is withdrawn from the bottom of said storage vessel to be circulated first through said secondary heat exchanger at a first flow rate in heat exchange relationship with products of combustion, then mixed with a portion of the liquid issuing from the outlet of said primary heat exchanger, and then caused, by action of a circulating pump placed in a primary heat exchanger loop, to flow through said primary heat exchanger at a flow rate greater than said first rate; and the thus heated liquid is returned to an upper section of the storage vessel in such a manner as to avoid mixing with the liquid stored in the bottom of the storage vessel.

6. A water heating assembly as claimed in claim 3 wherein:

the primary heat exchanger is a coil of tubing surrounding the combustion chamber and combustion gases flow radially over that tubing; and the secondary heat exchanger is a coil of tubing and gases from the primary heat exchanger flow axially over the secondary coil.

7. A water heating assembly as claimed in claim 6 wherein the primary and secondary coils are coaxial.

8. A water heating assembly as claimed in claim 7 further comprising a tertiary heat exchanger located concentrically within the secondary heat exchanger wherein an unburned fuel/air mixture is pre-heated by the combustion gases from the secondary heat exchanger.

9. A water heating assembly as claimed in claim 3 or 4 further comprising means for pre-mixing fuel gas and an amount of air sufficient for complete combustion of the gas.

10. A water heating assembly as claimed in claim 9 wherein the flow of the gas/air mixture into the burner is induced by a blower positioned downstream from the secondary heat exchanger.

11. A water heating system as claimed in claim 4 wherein:

the primary heat exchanger is a coil of tubing surrounding the combustion chamber and combustion gases flow radially over that tubing; and the secondary heat exchanger is a coil of tubing and gases from the primary heat exchanger flow axially over the secondary coil.

12. A water heating system as claimed in claim [1] *4* wherein the primary and secondary coils are coaxial.

13. A water heating system as claimed in claim 12 further comprising a tertiary heat exchanger located concentrically within the secondary heat exchanger wherein an unburned fuel/air mixture is pre-heated by the combustion gases from the secondary heat exchanger.

14. A water heating system as claimed in claim 4 or 13 further comprising means for pre-mixing fuel gas and an amount of air sufficient for complete combustion of the gas.

15. A water heating system as claimed in claim 14 wherein the flow of the gas/air mixture into the burner is induced by a blower positioned downstream from the secondary heat exchanger.

16. A water heating system as claimed in claim 4 wherein the water storage assembly is a tank separated into hotter water and cooler water volumes by a baffle.

17. A water heating system as claimed in claim 16 further comprising a diffuser positioned over a cold water inlet into the bottom of the tank.

18. A water heating system as claimed in claim 4 further comprising a water flow path from the output of the primary heat exchanger to its input for recirculating water in the primary heat exchanger, said water flow path and the primary heat exchanger forming a primary heat exchanger loop, and means, including a pump in said primary heat exchanger loop, for recirculating hot water through the primary heat exchanger mixed with water from the secondary heat exchanger to raise the temperature of mixed water to a temperature above the dew point temperature of the combustion gases.

19. A liquid heater according to claim 5 in which partially cooled products of combustion are directed from said secondary heat exchanger to flow axially through a tertiary heat exchanger located concentrically within said secondary heat exchanger, product of combustion in said tertiary heat exchanger being in heat transfer communication with the unburned fuel/air mixture flowing towards said fuel burner.

*20. A method as claimed in claim 1 further comprising returning the water to the storage tank at a flow rate and temperature controlled by a thermostatic valve.*

*21. A method as claimed in claim 1 further comprising varying the input to the burner to maintain a steady temperature of water returned to the storage vessel.*

*22. A liquid heating assembly comprising:*

*a combustion chamber;*

*a primary heat exchanger in the gas flow path of products of combustion from the combustion chamber;*

*a secondary heat exchanger for receiving gases cooled by the primary heat exchanger;*

*a cool liquid inlet to the secondary heat exchanger;*

*means for circulating cool liquid from the cool liquid inlet through the secondary heat exchanger at a first flow rate in heat exchange relationship with the combustion gases;*

*a liquid flow path from the output of the primary heat exchanger to its input for recirculating liquid in the primary heat exchanger, said liquid flow path and the primary heat exchanger forming a primary heat exchanger loop;*

*a pump in the primary heat exchanger loop for pumping liquid from the secondary heat exchanger and a portion of the liquid from the output of the primary heat exchanger through the primary heat exchanger at a flow rate greater than said first flow rate to cool the combustion gases to a temperature which is above their dew point temperature.*

*23. A liquid heat assembly as claimed in claim 22 further comprising a thermostatic valve for controlling the flow rate through the heat exchangers.*

*24. An apparatus as claimed in claim 22 wherein the gas flow path past the primary heat exchanger provides a first gas velocity through the primary heat exchanger and the combustion gases then flow past the secondary heat exchanger at a second gas velocity substantially greater than the first.*

*25. An apparatus as claimed in claim 24 further comprising a thermostatic valve to control the flow rate of liquid withdrawn from and returned to the storage vessel.*

*26. An apparatus as claimed in claim 24 wherein:*

*the primary heat exchanger surrounds the combustion chamber and combustion gases flow radially through that heat exchanger; and*

*a secondary heat exchanger in which gases from the primary heat exchanger flow in an axial direction sequentially past multiple liquid flow paths of the secondary heat exchanger.*

*27. A liquid heating assembly as claimed in claim 22 further comprising a liquid storage tank having a naturally stratified upper zone of heated liquid and a lower zone of cooler liquid, the volume of the lower zone of cooler liquid and the flow rate through the primary and secondary heat exchangers being such that the liquid provides for condensation of the combustion gases in the secondary heat exchanger through substantially the entire heating cycle of the burner.*

*28. An apparatus as claimed in claim 22 wherein:*

*the primary heat exchanger is tubing surrounding the combustion chamber and combustion gases flow radially over that tubing; and*

*the secondary heat exchanger is a coil of tubing and gases from the primary heat exchanger flow axially over the secondary coil.*

*29. A method of heating liquid comprising:*

*in a secondary heat exchanger passing liquid in heat exchange relationship with combustion gases that have been cooled by a primary heat exchanger to further cool those gases below their dew point temperature so as to extract some of the latent heat of vaporization from the gases and to heat the liquid;*

*passing the liquid heated in the secondary heat exchanger into a primary heat exchanger in heat exchange relationship with gases from the burner assembly to cool those gases to a temperature above their*

*dew point temperature to further heat the liquid but avoid condensation of the flue gases in the primary heat exchanger; and*

*mixing a portion of the liquid from the output of the primary heat exchanger with the liquid from the secondary heat exchanger and recirculating that liquid through the primary heat exchanger to provide a flow rate in the primary heat exchanger greater than the flow rate in the secondary heat exchanger.*

*30. A method as claimed in claim 29 further comprising returning the liquid to a storage tank at a flow rate and temperature controlled by a thermostatic valve.*

*31. A liquid heater as claimed in claim 5 wherein the liquid is water heated solely by the burner assembly to a temperature of at least about 140° F.*

*32. A liquid heating assembly as claimed in claim 22 wherein the liquid is water heated solely by products of combustion of the combustion chamber to a temperature of at least about 140° F.*

*33. A method as claimed in claim 29 wherein the liquid is water to be heated solely by the combustion gases to a temperature of at least about 140° F.*

*34. An apparatus for heating liquid in a burner assembly and storing the heated liquid comprising:*

*a burner assembly;*

*a heat exchanger assembly;*

*an insulated storage vessel having a naturally stratified upper zone of heated liquid and a lower zone of cooler liquid separated by a baffle;*

*withdrawing means for withdrawing cooler liquid from the lower zone of cooler liquid and passing the withdrawn liquid through the heat exchanger assembly in heat exchange relationship with combustion gases from the burner assembly to cool those gases below their dew point temperature so as to extract some of the latent heat of vaporization from the gases to heat the withdrawn liquid; and*

*returning means for returning the thus heated liquid to the storage vessel at a return location in the storage vessel above the lower zone of cooler liquid and so as to avoid mixing with the cooler liquid, the return location being such that the volume of cooler liquid below it is large enough to provide for condensation of the combustion gases through a substantial portion of the heating cycle of the burner assembly.*

*35. An apparatus for heating liquid in a burner assembly and storing the heated liquid comprising:*

*a burner assembly;*

*a heat exchanger assembly;*

*an insulated storage vessel having a naturally stratified upper zone of heated liquid and a lower zone of cooler liquid;*

*withdrawing means for withdrawing cooler liquid from the lower zone of cooler liquid and passing the withdrawn liquid through the heat exchanger assembly in heat exchange relationship with combustion gases from the burner assembly to cool those gases below their dew point temperature so as to extract some of the latent heat of vaporization from the gases to heat the withdrawn liquid; and*

*returning means for returning the thus heated liquid to the storage vessel at a return location in the storage vessel above the lower zone of cooler liquid and so as to avoid mixing with the cooler liquid, the return location being such that the volume of cooler liquid below it is large enough to provide for condensation of the combustion gases through a substantial portion of the heating cycle of the burner assembly; and*

*a thermostatic valve to control the flow rate of liquid withdrawn from and returned to the storage vessel.*

*36. An apparatus for heating liquid in a burner assembly and storing the heated liquid comprising:*

*a burner assembly;*

*a heat exchanger assembly;*

*an insulated storage vessel having a naturally stratified upper zone of heated liquid and a lower zone of cooler liquid;*

*withdrawing means for withdrawing cooler liquid from the lower zone of cooler liquid and passing the withdrawn liquid through the heat exchanger assembly in heat exchange relationship with combustion gases from the burner assembly to cool those gases below their dew point temperature so as to extract some of the latent heat of vaporization from the gases to heat the withdrawn liquid; and*

*returning means for returning the thus heated liquid to the storage vessel at a return location in the storage vessel above the lower zone of cooler liquid and so as to avoid mixing with the cooler liquid, the return location being such that the volume of cooler liquid below it is large enough to provide for condensation of the combustion gases through a substantial portion of the heating cycle of the burner assembly; and*

*the heat exchanger assembly comprising a primary heat exchanger and a secondary heat exchanger for receiving gases cooled by the primary heat exchanger, the apparatus further comprising a liquid flow path from the output of the primary heat exchanger to its input for recirculating liquid in the primary heat exchanger, said liquid flow path and the primary heat exchanger forming a primary heat exchanger loop, and a pump in the primary heat exchanger loop for pumping liquid from the secondary heat exchanger and a portion of the liquid from the output of the primary heat exchanger through the primary heat exchanger.*

*37. An apparatus as claimed in claim 36 further comprising a thermostatic valve to control the flow rate of liquid withdrawn from and returned to the storage vessel.*

*38. An apparatus as claimed in claim 36 wherein the flow path of combustion gases past the primary heat exchanger provides a first gas velocity through the primary heat exchanger and the combustion gases then flow past the secondary heat exchanger at a second gas velocity substantially greater than the first.*

*39. An apparatus as claimed in claim 38 further comprising a thermostatic valve to control the flow rate of liquid withdrawn from and returned to the storage vessel.*

*40. An apparatus as claimed in claim 38 wherein:*

*the primary heat exchanger surrounds the combustion chamber and combustion gases flow radially over that heat exchanger; and*

*gases from the primary heat exchanger flow in an axial direction sequentially past multiple liquid flow paths of the secondary heat exchanger.*

*41. An apparatus for heating liquid in a burner assembly and storing the heated liquid comprising:*

*a burner assembly;*

*a heat exchanger assembly comprising a primary heat exchanger and a secondary heat exchanger, wherein the flow path of combustion gases past the primary heat exchanger provides a first gas velocity through the primary heat exchanger and the combustion gases then flow past the secondary heat exchanger at a second gas velocity substantially greater than the first;*

*an insulated storage vessel having a naturally stratified upper zone of heat liquid and a lower zone of cooler liquid;*

*withdrawing means for withdrawing cooler liquid from the lower zone of cooler liquid and passing the withdrawn liquid through the heat exchanger assembly in heat exchange relationship with combustion gases from the burner assembly to cool those gases below their dew point temperature so as to extract some of the latent heat of vaporization from the gases to heat the withdrawn liquid; and*

*returning means for returning the thus heated liquid to the storage vessel at a return location in the storage vessel above the lower zone of cooler liquid and so as to avoid mixing with the cooler liquid, the return location being such that the volume of cooler liquid below it is large enough to provide for condensation of the combustion gases through a substantial portion of the heating cycle of the burner assembly.*

*42. An apparatus for heating liquid in a burner assembly and storing the heated liquid comprising:*

*an insulated liquid storage assembly including a naturally stratified volume of hot liquid in communication with a volume of cooler liquid, the volumes of hot liquid and cooler liquid being separated by a baffle;*

*a heat exchanger assembly for passing liquid, withdrawn from the volume of cooler liquid, in heat exchange relationship with combustion gases from the burner assembly to cool those gases below their dew point temperature so as to extract some of the latent heat of vaporization from the gases to heat the withdrawn liquid; and*

*circulating means for circulating the liquid from the volume of cooler liquid through the heat exchanger and returning the liquid to the volume of hot liquid, the volume of cooler liquid and the flow rate established by the circulating means being such that the circulated liquid provides for condensation of the combustion gases through a substantial portion of the heating cycle of the burner.*

*43. An apparatus for heating liquid in a burner assembly and storing the heated liquid comprising:*

*a liquid storage assembly including a volume of hot liquid and a volume of cooler liquid in communication with the volume of hot liquid;*

*a heat exchanger assembly for passing liquid, withdrawn from the volume of cooler liquid, in heat exchange relationship with combustion gases from the burner assembly to cool those gases below their dew point temperature so as to extract some of the latent heat of vaporization from the gases to heat the withdrawn liquid;*

*circulating means for circulating the liquid from the volume of cooler liquid through the heat exchanger and returning the liquid to the volume of hot liquid, the volume of cooler liquid and the flow rate established by the circulating means being such that the circulated liquid provides for condensation of the combustion gases through a substantial portion of the heating cycle of the burner; and*

*the heat exchanger assembly comprising a primary heat exchanger and a secondary heat exchanger for receiving gases cooled by the primary heat exchanger, the apparatus further comprising a liquid flow path from the output of the primary heat exchanger to its input for recirculating liquid in the primary heat exchanger, said liquid flow path and the primary heat exchanger forming a primary heat exchanger loop, and a pump in the primary heat exchanger loop for pumping liquid from the secondary heat exchanger and a portion of the liquid from the output of the primary heat exchanger through the primary heat exchanger.*

*44. An apparatus as claimed in claim 43 further comprising a thermostatic valve to control the flow rate of liquid withdrawn from and returned to the storage vessel.*

*45. An apparatus as claimed in claim 43 wherein the gas flow path past the primary heat exchanger provides a first gas velocity through the primary heat exchanger and the combustion gases then flow past the secondary heat exchanger at a second gas velocity substantially greater than the first.*

*46. An apparatus as claimed in claim 45 further comprising a thermostatic valve to control the flow rate of liquid withdrawn from and returned to the storage vessel.*

*47. An apparatus as claimed in claim 45 wherein:*

*the primary heat exchanger is tubing surrounding the combustion chamber and combustion gases flow radially over that tubing; and*

*gases from the primary heat exchanger flow in an axial direction sequentially past multiple liquid flow paths of the secondary heat exchanger.*

*48. An apparatus for heating liquid in a burner assembly and storing the heated liquid comprising:*

*a liquid storage assembly including a volume of hot liquid and a volume of cooler liquid in communication with the volume of hot liquid;*

*a heat exchanger assembly for passing liquid, withdrawn from the volume of cooler liquid, in heat exchange relationship with combustion gases from the burner assembly to cool those gases below their dew point temperature so as to extract some of the latent heat of vaporization from the gases to heat the withdrawn liquid;*

*a heat exchanger assembly comprising a primary heat exchanger and a secondary heat exchanger, wherein the gas flow path past the primary heat exchanger provides a first gas velocity through the primary heat exchanger and the combustion gases then flow past the secondary heat exchanger at a second gas velocity substantially greater than the first; and*

*circulating means for circulating the liquid from the volume of cooler liquid through the heat exchanger and returning the liquid to the volume of hot liquid, the volume of cooler liquid and the flow rate established by the circulating means being such that the circulated liquid provides for condensation of the combustion gases through a substantial portion of the heating cycle of the burner.*

*49. In a liquid heater, a heat exchanger assembly comprising:*

*a central burner;*

*a primary heat exchanger surrounding the central burner, the flow of combustion products from the burner being essentially radially outward through the surrounding heat exchanger at a first velocity; and*

*a secondary heat exchanger which is coaxial with the primary heat exchanger, the partially cooled combustion products from the primary heat exchanger being directed to flow in an axial direction sequentially past multiple liquid flow paths in the secondary heat exchanger at a second velocity substantially greater than the first; and*

*a tertiary heat exchanger located coaxially within the secondary heat exchanger wherein an unburned fuel/air mixture is preheated by the combustion gases from the secondary heat exchanger.*

*50. In a liquid heater, a heat exchanger assembly comprising:*

*a central burner;*

*a primary heat exchanger surrounding the central burner, the flow of combustion products from the burner being essentially radially outward through the surrounding heat exchanger at a first velocity; and*

*a secondary heat exchanger which is coaxial with the primary heat exchanger, the partially cooled combustion products from the primary heat exchanger being directed to flow in an axial direction sequentially past multiple liquid flow paths in the secondary heat exchanger at a second velocity substantially greater than the first;*

*wherein the combustion products are diverted from a radial flow path to an axial flow path in an annulus surrounding the primary heat exchanger and are then directed into the secondary heat exchanger which is axially displaced from the annulus.*

* * * * *